Patented Sept. 9, 1924.

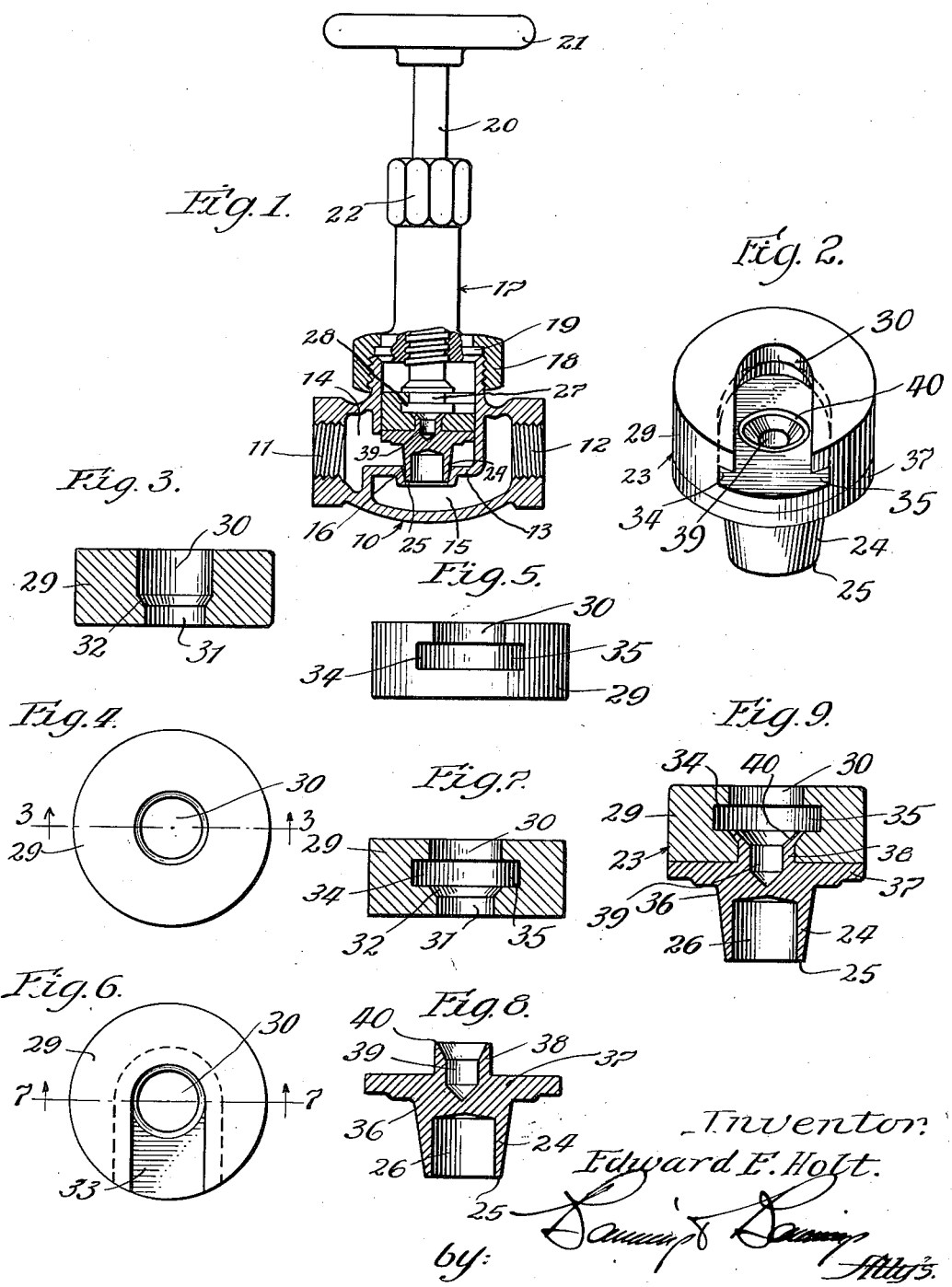

1,508,103

UNITED STATES PATENT OFFICE.

EDWARD E. HOLT, OF CHICAGO, ILLINOIS, ASSIGNOR TO HOLT AUTO DEVICES COMPANY, OF CHICAGO, ILLINOIS, A CORPORATION OF ILLINOIS.

VALVE AND THE LIKE.

Application filed July 15, 1922. Serial No. 575,425.

*To all whom it may concern:*

Be it known that I, EDWARD E. HOLT, a citizen of the United States, residing at Chicago, in the county of Cook and State of Illinois, have invented certain new and useful Improvements in Valves and the like, of which the following is a specification.

This invention has to do with certain improvements in valves. It has to do particularly with improvements in valves for steam, compressed air, etc., but it will presently appear that the features of construction herein disclosed are not limited to use in valves intended for any specific purpose, and I do not intend to limit the present application to valves for any particular purpose, except as I may do so in the claims.

One of the objects of the invention is to provide a construction of valve which will establish a very perfect seal against the flow or escape of the steam or air or other fluid, such seal being established with the application of a very small amount of force in the closing of the valve itself.

Another object in this connection is to provide a construction of valve such that the sealing action will take place between two metallic elements as distinguished from an arrangement in which one of the elements is of fiber, composition or other similar material. Another object in connection with the foregoing is to provide a construction such that a sufficient amount of yieldability or flexibility should be provided at the point of seal to permit the valve and the seat to come together in sealing fashion around the entire periphery of the seat notwithstanding the fact that both the valve and the seat are of metal.

Another feature of the invention relates to the provision of an arrangement in which the valve plug is of conical form and takes into a conical valve seat, the point of contact between the plug and seat being established at the edge of the plug. In this connection a further object is to so form the plug that its contacting edge shall have a certain amount of flexibility or yieldability, so that it can adjust itself to a position of perfect contact between the plug and seat throughout the entire periphery of the plug.

A further feature of the invention relates to the construction of the valve plug itself. In this connection one of the objects of the invention is to provide a construction such that use may conveniently be made of Monel metal or other similar alloy of great toughness and durability. It is particularly desirable to use a metal having these characteristics for the yieldable edge portion of the plug, so that this portion will successfully stand up under the service which it receives in repeated seatings and unseatings against the conical valve seat.

In connection with this object it may also be remarked that Monel metal and other alloys which are peculiarly well adapted for this work are very difficult to work by machine tool operations. It is, therefore, an ebject of the invention to provide a construction of plug such that the necessary machine tool operations can be reduced to a minimum and simplified as much as possible.

In connection with the foregoing feature, it is also another object to provide a valve plug of such construction that the assembly thereof can be produced with the use of a minimum amount of the Monel or similar alloy metal, since these metals are relatively expensive.

Other objects and uses of the invention will appear from a detailed description of the same, which consists in the features of construction and combinations of parts hereinafter described and claimed.

Referring to the drawing:

Figure 1 shows a vertical section through a steam valve embodying the features of the present invention, and embodying a plug of the construction herein set forth in detail;

Fig. 2 shows a perspective view of the assembled valve plug;

Fig. 3 shows a vertical section through the brass block for the plug;

Fig. 4 shows a plan view corresponding to Fig. 3;

Fig. 5 shows a view of the brass block after the same has been "profiled";

Fig. 6 shows a plan view corresponding to Fig. 5;

Fig. 7 shows a vertical section of the brass block after it has been profiled;

Fig. 8 shows a vertical section through the Monel metal element; and

Fig. 9 shows a vertical section through the brass block and Monel metal element after they have been assembled.

I will state at this point that while I have herein disclosed the particular construction of valve plug as being associated and used with a valve for the handling of steam and other gases, still it will be evident that as far as this plug itself is concerned it may be used in valves of other constructions and intended for other purposes. Therefore, I do not intend to limit the plug itself to use in connection with steam valves and the like, except as I may do so in the claims.

Bearing the foregoing in mind, the particular valve disclosed includes a body portion 10 having the pipe connections 11 and 12. A partition 13 extends across the body portion and divides the same into upper and lower chambers 14 and 15 respectively. Said partition is also provided with a central port 16 to permit fluid to pass between the chambers 14 and 15. This port 16 is tapered in form, being of larger diameter in the upper than in its lower portion.

A collar or bonnet 17 is removably connected to the body portion 10 by means of a coupling 18 which threads down onto the body portion. For this purpose the lower end of the collar 17 is provided with a shoulder 19 against which the coupling 18 works.

Extending through the collar 17 is a stem 20 on the upper end of which is a handle wheel 21. If desired, a stuffing box may be provided between the collar and the stem 20, said stuffing box including a tightening nut 22 of familiar form.

The lower portion of the stem 20 is connected to a valve plug designated in its entirety by the numeral 23. This valve plug has the downwardly depending circular tapering valve flange 24 whose lower edge 25 wedges into the tapered port 16 when the plug is forced home. The flange 24 is established by a central recess 26, and is of such thinness that its lower edge will have sufficient flexibility to enable it to come into firm and even engagement with the valve seat entirely around its periphery.

Examination of Fig. 9 in particular shows that the flange 24 tapers in diameter, being smaller at its contacting edge 25 than elsewhere. The valve seat 16 is also tapered but the taper of the valve seat is more rapid than that of the plug so as to insure that the lower edge of the flange 24 will establish the first contact with the seat. As previously stated the plug 23 is raised and lowered by the operation of the stem 20. In order to permit a full opening of the port, the arrangement should be such as to allow the plug to be fully withdrawn from the port, raising its lower edge 25 above the port. Furthermore, in order to ensure a most perfect seating of the plug it should be allowed sufficient movement with respect to the stem 20 to permit the plug to adapt itself to that position which it naturally assumes in seating. Furthermore, in order to ensure a uniform wear and consequently most satisfactory operation over a period of time, the plug should be allowed to rotate with respect to the stem. The construction should also be such as to permit the plug to be easily removed from the stem for replacement or repair. I have, therefore, provided the construction which I will now explain in detail.

The lower end of the stem 20 is recessed as shown at 27, and the flange 28 is thus provided on the extreme end of the stem. The plug 23 includes an upper block 29 of brass or the like preferably circular in form. This block is first provided with a central perforation including an upper relatively large passage 30 in communication with a lower and smaller passage 31, there being a tapered shoulder 32 at the point where these passages come together. After the block has been formed in the manner shown in Figs. 3 and 4, it is "profiled" to establish a side channel 33, and also to establish the under cut portions 34 and 35 as clearly shown in Figs. 5 and 6.

The valve flange 24 is established by means of a flange element or block of Monel metal 36 of the general form shown in Fig. 8. The block includes a flange 37 which is adapted to seat squarely against the bottom face of the brass block 29, and also includes an upstanding neck 38. This neck is provided with a central recess 39, so that the upper edge 40 of the neck is relatively thin as shown in Fig. 8.

To assemble the parts, the neck 38 is set into the lower smaller opening 31 of the brass block, and then the upper edge 40 of said neck is upset as shown in Fig. 9, thus locking the two elements together.

While I have herein shown and described only a single embodiment of the features of my present invention, still I do not intend to limit myself to the same except as I may do so in the claims.

I claim:

1. A valve including in combination a partition having a circular tapered port, a stem in alignment with said port, a circular valve plug, and a circular guide partition surrounding the stem and plug and of size to guide the plug in its movements towards and from the port, the plug including in combination a metal base block having in its upper face a profiled groove for the swivel and removable connection therewith of the lower end of the stem, and also being provided with a central through perforation, and a flange element of Monel metal having a central neck extending through the perforation of the base block and riveted thereinto, and having a circular tapering flange to seat into the port in wedging fashion, substantially as described.

2. A valve including in combination a partition having a circular tapered port, a stem in alignment with said port, a circular valve plug, and a circular guide partition surrounding the stem and plug and of size to guide the plug in its movements towards and from the port, the plug including in combination a metal base block having in its upper face a groove for the swivel and removable connection therewith of the lower end of the stem and also being provided with a central through perforation, and a flange element having a central neck extending through the perforation of the base block and riveted thereinto, and having a circular tapering flange to seat into the port in wedging fashion, substantially as described.

3. A valve including in combination a partition having a tapered port, a stem in alignment with said port, a circular valve plug, and a circular guide partition surrounding the stem and plug and of size to guide the plug in its movements towards and from the port, the plug including in combination a metal base block having in its upper face a recess for the accommodation swivelly of the lower end of the stem, and also being provided with a central through perforation, and a flange element having a central neck extending through the perforation of the base block and riveted thereinto, and having a circular tapering flange to seat into the port in wedging fashion, substantially as described.

4. A valve including in combination a partition having a circular tapered port, a stem in alignment with said port, a circular valve plug, and means for guiding the plug in its movement towards and from the port to insure proper co-operation of the plug with the port, the plug including in combination a metal base block having in its upper face a recess for the accommodation swivelly of the lower end of the stem, and also being provided with a central through perforation, and a flange element having a central neck extending through the perforation of the base block and riveted thereinto, and having a central tapering flange to seat into the port in wedging fashion, substantially as described.

5. As a new article of manufacture a valve plug comprising a circular base block of metal having in its upper face a transverse profiled recess, and having in its central portion a through perforation reaching into said recess, and a flange block of Monel metal seated against the bottom face of the base block, said flange block having a central neck extending through the perforation and riveted thereinto, and also having a circular tapering flange, substantially as described.

6. As a new article of manufacture a valve plug comprising a circular base block of metal having in its upper face a recess for the accommodation of an operating stem, and having in its central portion a through perforation reaching into said recess, and a flange block seated against the bottom face of the base block, said flange block having a central neck extending through the perforation and riveted thereinto, and also having a circular tapering flange, substantially as described.

7. As a new article of manufacture a valve plug comprising a metal base block for attachment to an operating stem, said base block having in its central portion a through perforation, and a flange block seated against the bottom face of the base block, said flange block having a central neck extending into the perforation and riveted thereinto, and also having a circular valve flange of tapered thickness, substantially as described.

EDWARD E. HOLT.